United States Patent [19]

Bellak

[11] 3,967,215

[45] June 29, 1976

[54] LASER REACTOR

[76] Inventor: Johannes G. Bellak, Crease Road, Budd Lake, N.J. 07828

[22] Filed: Aug. 14, 1969

[21] Appl. No.: 859,231

Related U.S. Application Data

[63] Continuation-in-part of Ser. No. 546,375, April 29, 1966, abandoned.

[52] U.S. Cl. .............................. 331/94.5 R; 176/1; 176/9
[51] Int. Cl.² .......................................... H03F 1/36
[58] Field of Search .................................. 176/1–9; 331/94.5

[56] References Cited
UNITED STATES PATENTS

| | | | |
|---|---|---|---|
| 3,241,085 | 3/1966 | Marcatili | 331/94.5 |
| 3,378,446 | 4/1968 | Whittlesey | 331/94.5 |
| 3,395,368 | 7/1968 | Koester | 331/94.5 |
| 3,414,835 | 12/1968 | Miller | 331/94.5 |

*Primary Examiner*—Verlin R. Pendegrass
*Assistant Examiner*—P. A. Nelson

[57] ABSTRACT

A device producing reactions in the chemical to thermonuclear range and beyond. Physical principles entail pressures, kinetic temperatures, and electromagnetic field strengths obtainable from convergent electromagnetic energy. Process converges closed electromagnetic wave on reactants thereby heating, compressing and confining, and stressing reactants under focal electromagnetic intensities, inducing therein endothermic, equithermic, exothermic or combinations thereof reactions, all types furnishing energy useful externally and the exothermic type furnishing energy useful as feedback for generating new electromagnetic waves for process cyclic operation. Embodiment consists of closed shell lasing element enclosing reaction chamber, source of reactants, sink for reactant byproducts, and a source of initial energy for priming the lasing element.

2 Claims, 9 Drawing Figures

LASER REACTOR

This application is a continuation-in-part of application Ser. No. 546,375, filed Apr. 29, 1966, now abandoned.

This invention is a means of utilization and control of reactions occurring between matter and matter, between matter and electromagnetic radiation, and between electromagnetic radiations to:

1. produce illimitably high kinetic temperatures,
2. produce illimitably high pressures,
3. generate useful forms of energy,
4. produce chemical and transmutation (fusion) reactions in matter,
5. produce electromagnetic radiation in the range from below infrared to beyond cosmic,
6. produce matter from electromagnetic energy,
7. generate propulsive forces,
8. generate gravitational waves and fields,
9. generate laser energy,
10. operate lasers from thermonuclear reactions,
11. feed energy back to a thermodynamic reaction to overcome radiant losses,
12. produce a new type of fusion bomb.

PHYSICAL PRINCIPLES

Examples of the many constructive means presently being applied to produce high temperature reactions in matter are:

Magnetic bottles (Pyrotron device, R.F. Post U.S. Pat. No. 3,170,841),

Ion sheaths (Astron device, N.C. Christofilos U.S. Pat. No. 3,071,525),

Magnetic tracks (Stellarator device, L. Spitzer Pat. 2,910,414),

Potential discharges (P.T. Farnsworth U.S. Pat. No. 3,258,402).

The device contemplated in this disclosure departs from the aforementioned and others under investigation in that it harnesses the unlimited radiation pressures, temperatures, and electromagnetic field strengths inherent in electromagnetic radiation formed from superposed photon energies. The standard relationships for the energy and momenta of photons are:

$$E = nh\nu, \quad p = nh/\nu$$

where
$E$ = energy in ergs,
$\nu$ = photon frequency in Hertz (cycles/sec),
$\lambda$ = wavelength in cm,
$p$ = momentum in gm-cm/sec,
$h$ = Planck's constant = 6.62 = $10^{-27}$erg-sec,
$n$ = integer equal to or greater than 1.

These equations state that the photon energy and photon momenta increase without limit as the frequency increases, and increase without limit as the number of photons increase. It is this energy and these momenta which are the source of the illimitable temperatures and the illimitable pressures in the process of this disclosure. This invention is also a means of generation and superposition of such photon electromagnetic energy. Furthermore, this invention is a means for impinging such energy on matter.

The relationship between electromagnetic energy and matter-particle energy with which it is in thermodynamic equilibrium at a given kinetic temperature is expressed in terms of the energy density of the electromagnetic radiation, and is given by Planck's empirical equation:

$$u(\nu)d\nu = 8\pi \frac{h\nu^3}{c^3} \frac{1}{\exp(\frac{h\nu}{kT}) - 1} d\nu$$

where
$\nu$ = frequency in Hz,
$d\nu$ = frequency differential range,
$u(\nu)$ = photon radiation diffuse energy density in ergs per unit frequency per unit volume,
$h$ = Planck's constant,
$c$ = velocity of light = $3 \times 10^{10}$cm/sec,
$k$ = Boltzmann's constant = $1.38 \times 10^{-16}$erg/°K,
$T$ = kinetic temperature in degrees Kelvin (°K),
$h\nu$ = energy of photon of frequency $\nu$, in ergs,
$kT = 3/2$ the kinetic energy possessed by a matter-particle at kinetic temperature T,
$\exp$ = base of Naperian logarithms = 2.71828 . . . . .

The pressure exerted by electromagnetic radiation is quantitatively equal to the radiation energy density:

$$P = u$$

where
$P$ = pressure in dynes/cm$^2$,
$u$ = radiation energy density in ergs/cm$^3$.

Plank's equation therefore not only gives the radiation energy density, but also the radiation partial pressure exerted in a given range $d\nu$ of frequencies:

$$P(\text{partial}) = u(\text{partial}) = u(\nu)d\nu.$$

The total pressure U due to all frequencies at temperature T would be:

$$U = \int_{\nu=0}^{\nu=\infty} u(\nu)d\nu = 8\pi \frac{h}{c^3} \int_{\nu=0}^{\nu=\infty} \frac{\nu^3}{\exp(\frac{h\nu}{kT}) - 1} d\nu.$$

The electromagnetic field strengths are related to the energy-current, or photon-flow Poynting's vector:

$$\vec{P} = \vec{E} \times \vec{H}$$

where (in practical units)
$\vec{P}$ = watts/cm$^2$,
$\vec{E}$ = electric field strength = volts/meter,
$\vec{H}$ = magnetic field strength = amperes/meter.

Alternatively, the energy density or pressure is expressed:

$$\vec{P}/c = \vec{E} \times \vec{H}/c$$

where
$c$ = velocity of light = $3 \times 10^8$ meters/sec.

The kinetic temperatures, pressures, and electromagnetic field stresses are obtained in this invention by focusing a substantially closed convergent electromagnetic wave on matter. Although the wave will be discussed in terms of spherical symmetry, other symmetries are applicable as for example, a cylindrical wave convergent upon its axis, a toroidal wave convergent upon its major circular axis, an ellipsoidal wave convergent upon its axes, or any geometrical construction having sufficient focal properties. This invention is also a means of returning energy into a reaction which energy would otherwise be lost through radiation to the chamber walls; in this particular application it is immaterial whether there is symmetry at all. Under certain conditions, this invention can be used to generate convergent shockwaves in matter, and the embodiment can be used as a form of thermonuclear bomb.

For a convergent electromagnetic wave of spherical symmetry it can be shown that the energy density and therefore the pressure varies inversely as the square of the radii:

$$P_r/P_R = u_r/u_R = R/r^2$$

where
$P_r$ = pressure at a smaller radius $r$,
$P_R$ = pressure at a larger radius $R$,
$u_r$ = energy density at $r$,
$u_R$ = energy density at $R$.
It also can be shown that the electric and magnetic intensities vary similarly:

$$\frac{E_r}{E_R} = \frac{|\vec{E}_r|}{|\vec{E}_R|} = \frac{H_r}{H_R} = \frac{|\vec{H}_r|}{|\vec{H}_R|} = \left(\frac{R}{r}\right)^2$$

where the subscripts are interpreted as above.

For matter in thermodynamic equilibrium with electromagnetic radiation at each point of a spherically convergent wave, the kinetic temperatures could be calculated from the energy density ratios using Planck's equation:

$$\frac{P_r}{P_R} = \frac{u_r}{u_R} = \left(\frac{R}{r}\right)^2 = \frac{\exp(\frac{h\nu}{kT_r}) - 1}{\exp(\frac{h\nu}{kT_R}) - 1}$$

where
$T_r$ = kinetic temperature at smaller radius $r$,
$T_R$ = kinetic temperature at radius $R$.
However, simple thermodynamic equilibrium under gradient conditions of a convergent wave are not always applicable nor are the convergent waves limited herein exclusively to the spherical form, therefore temperatures pertinent to this disclosure will be calculated where required by making use of an empirical equation developed from experimental results by Gregg[1].

Other principles which enter into the operation of this teaching are the concepts of "blackbodies" and "whitebodies". A true blackbody is equivalent to matter at the absolute zero of kinetic temperature (0°K); it can absorb energy only and cannot radiate and therefore does not reflect incident energy. A true whitebody is equivalent to matter at the infinity of temperature (co°K); it emits energy only and cannot absorb and therefore reflects incident energy. Matter at the enormous temperatures obtainable with the means of this disclosure therefore tends to whitebody characteristics as contrasted to the blackbody characteristics matter tends to acquire at comparatively low temperatures. Experience with lasers shows that matter raised to high temperatures becomes opaque to the radiation which produced the temperature, in keeping with whitebody principles. The boundary surfaces of such plasmas are discrete, although the discrete boundary surface of the Sun which is at a comparatively low temperature of 6000°K, is a more ready example.

In Sun bodies, high temperatures and pressures are produced at the center as a result of the intense gravitational central-force field arising from the stellar mass. In the Sucn the internal temperature is estimated to reach $2.6 \times 10^7$ °K although the surface temperature is only $6 \times 10^3$ °K. In the principles of the process taught in this disclosure, a central-force field is constructed from convergent electromagnetic energy. As a direct consequence of the use of radiation pressure rather than gravitational pressure, kinetic temperatures and pressures such as those found in the Sun and other, hotter objects of a cosmic nature can be easily exceeded by many orders of magnitude.

The Einsten relation $E = mc^2$ may be written $$E/c^2 \rightleftharpoons m \text{ or } E \rightleftharpoons mc^2$$

to signify transformations between energy and mass. These equations can be appropriately substituted into Planck's equation and the result interpreted to signify an equilibrium interchange between radiant energy $E = h\nu$ and its equivalent mass $m = E/c^2 = h\nu/c^2$:

$$u(\nu) = u\left(\frac{c^2}{h}m\right) = u_m(m) = 8\pi \frac{m^3c^3}{h^2} \frac{1}{\exp(\frac{mc^2}{kT_m}) - 1}$$

where $T_m$ is defined below.

Examples of such interchange are the $h\nu$ energy and its correspondent mass m evolved and absorbed in an incandescent solid, in chemical reactions, and in thermonuclear reactions. Also, by Wien's displacement law, the mean spectral frequency $\nu_m$ is proportional to the mean kinetic temperature $T_m$:

$$\nu_m = cT_m/b$$

where $b$ = Wien's constant = 0.829 cm °K.
The mean photon energy is therefore $$h\nu_m = hc/b\, T_m$$

which when substituted into the Einstein transformation equations yields $$\frac{h\nu_m}{c^2} = \frac{hc}{bc^2}T_m \rightleftharpoons m$$

or $$h\nu_m = \frac{hc}{b}T_m \rightleftharpoons mc^2$$

respectively, where $m$ is to be interpreted as the mean unit of mass transformed at kinetic temperature $T_m$. Furthermore, for particulate matter of mean individual mass M in equilibrium with radiant energy $h\nu = mc^2$ of frequency $\nu_m$, the mean particulate velocity $v_M$ at $T_m$ can be derived by equating $kT_m$ to 3/2 the relativistic particulate kinetic energy $Mc^2[(1 - v_M^2c^2)^{-1/2} - 1]$ from which:

$$v_M = c\left[1 - \left(\frac{2}{3}\frac{k}{mc^2}T_m + 1\right)^{-1/2}\right]$$

$$= c\left[1 - \left(\frac{2}{3}b\frac{k}{h}\frac{m}{M} + 1\right)^{-1/2}\right]$$

The velocity $v_M$ bears a correspondence to the velocities of atoms in incandescent matter, chemical and thermonuclear reactions, and more significantly applies to the particle collision-velocities experienced in accelerators and found in cosmic regions. Since the kinetic temperatures and the pressures are obtained in this invention from interaction between radiant electromagnetic energy and matter, the foregoing quantitative considerations apply, and $E \rightleftarrows mc^2$ transformation reactions covering the range from chemical to thermonuclear to cosmic and beyond can be produced accordingly.

Figure 1:
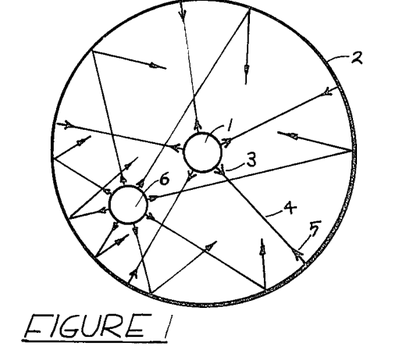
FIG. 1 is a cross-sectional view of a closed spherical reflector representing reflections from various radiant energy sources.

In FIG. 1., if a source of radiant electromagnetic energy is centered at the focus of a closed spherical reflector 2 as represented in the Figure in cross-section, then divergent radiant energy represented conceptually by the outwardly oriented arrows such as 3 on the radial trajectories 4 strikes the reflector 2 and is converged back to the center along the same trajectories 4 as represented by the inwardly oriented arrows 5. Radiant energy concentrated back to the source thusly cannot raise the temperature there higher, as is well known from optical imaging theory. Furthermore, radiant energy originating from an off-focus region such as 6 cannot be concentrated to the focal center.

If, as in (cross-sectional) FIG. 2., a similar reflector 7 is lined with a thickness of lasing material 8, radiant energy originating in a focal region will be reflected similarly as in FIG. 1., however, the lasing element introduces a new action: both diffuse, and off-focus originating energy 9 as represented by arrows such as 10, as well as energy originating elsewhere, excite the lasing element 8, which will subsequently release its characteristic radiation focally, thereby producing a convergent, spherical, coherent electromagnetic wave. Also, since laser action converts diffuse radiant energy originating anywhere into highly directional energy, the temperature at the focal point of convergence can be many orders of magnitude higher than that of the source. The characteristic of any lasing lamina of converting energy from any source and direction into oriented form allows the possibility of projecting radiant energy 12 from an external source 14 into the spherical cavity 15 through a small orifice 16, with the result that such energy will also be converted into a spherical, convergent, coherent electromagnetic wave by the lasing lamina. The manner in which the spherical shell lasing element produces focally projected coherent energy from diffuse energy is as follows.

Figure 2:
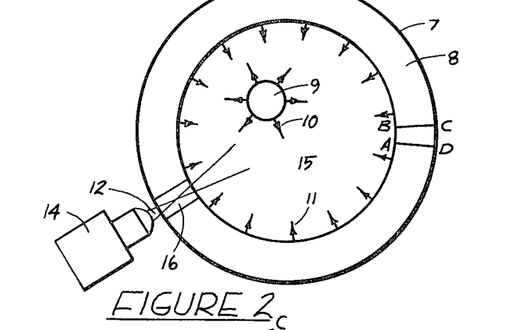
FIG. 2 is FIG. 1 lined with a lasing material lamina to show spatial rectification of incident radiant energy toward inherent spherical focus.
Figures 3, 4, 5:
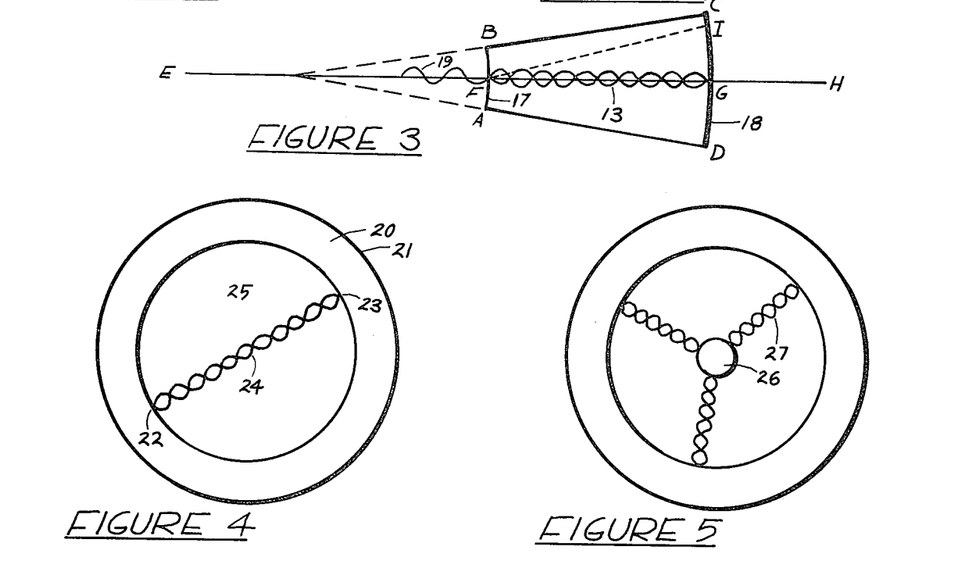
FIG. 3 shows establishment of lasing modes in a spherical sector of lasing material lamina of FIG. 2.
FIG. 4 shows a portion of a spherical standing wave mode of spatially rectified radiant energy propagating through focus of FIG. 2.
FIG 5 shows portions of a hollow spherical standing wave mode resulting from reflective sphere situate at focus of FIG. 2.

FIG. 3. is a sectional representation of a conical, radially symmetric sector ABCD of the lasing element 8 of FIG. 2.; like letters in both Figures have the same significance. The sector ABCD forms a laser resonator of rod shape having spherical end-faces which define one form of confocal resonator well known to the laser art. In laser action a standing wave as represented by 13 is called a mode and is developed by atomic processes acting in concert with and between the resonator end-faces which delineate the pertinent material boundaries of the laser configuration. If both faces were totally reflective and the dissipative losses negligible, the standing wave would persist indefinitely. To obtain useful coherent energy externally, one face 17 is made only partially reflective, that is, emissive, and the other face 18 is made reflective, with the result that the established standing wave decreases in intensity as part of its energy 19 is emitted. The mode persists until all of its energy is emitted, and the time of persistence is called the time-constant of the emission. The mode intrinsically (also called the preferential mode) established by laser action is the axial mode, represented here by the standing wave extant between F and G along the conical axis EFGH. Off-axis modes such as might be established between F and I decrease in liklihood the greater the deviation from the axis EFGH. Since there are an unlimited number of radially equivalent axes congruent to the described conical axis EFGH through the focal point of a spherical lasing lamina, the totality of modes therein will be established radially, thus obtaining a spherically convergent electromagnetic wave, the spherical coherency being established by the coupling of modes between adjacent radii. A laser can be operated by suffusing the lasing material with spectral energy generated for example, by flash lamps. The laser atomic and nucleus states are charged (excited, pumped up) by the suffusing energy and discharged from those states as determined by the atomic and nucleus properties, and modally as determined by the laser resonator geometry. It follows that the spherical lasing lamina 8 can be charged by radiant energy originating anywhere, and will discharge focally as determined by the spherical symmetry. The result will be a convergent, spherical, coherent electromagnetic wave focused on its center of spherical symmetry. These actions are inherent in the properties of matter acting in concert with electromagnetic energy and the discovery by the inventor that laser principles can be applied to the production of cosmic pressures and temperatures as disclosed herein forms the basis of the invention.

Figure 6:
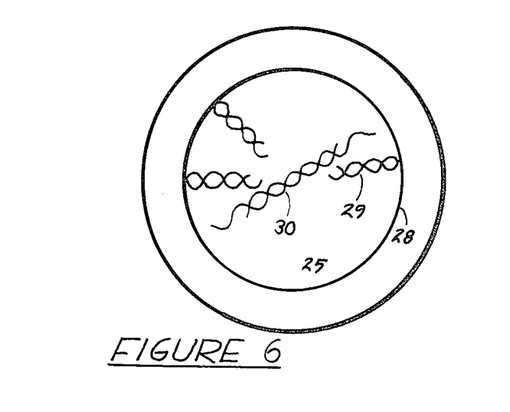
FIG. 6 shows portions of transient partial standing waves occurring when diametral propagation time through focus of FIG. 2 is longer than generation time of said waves.
Figure 7:
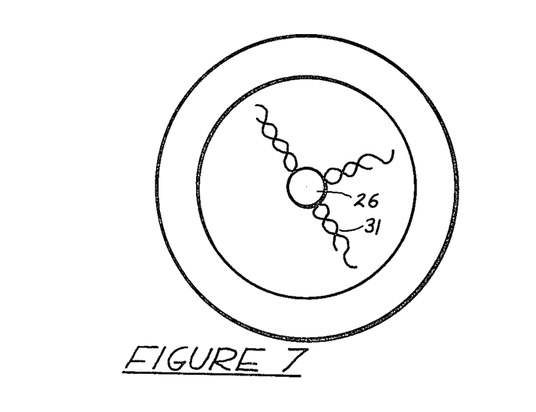
FIG. 7 shows portions of transient partial standing waves resulting from reflective sphere situate at focus of FIG. 2 and diametral propagation time is longer than generation time of such wave.

Several of many pertinent forms of convergent wave relevant to this invention are illustrated in FIGS. 4 through 7, which represent cross-sectionally a spherical lasing element with its concomitant enclosed chamber 15, and wherein like numbers represent similar entities. In FIG. 4., if the time-constant of the lasing element consisting of the lamina 20 and its reflector 21, is long compared to the time taken by a wavelet to traverse a diameter than the photons emanating from opposing diametral points such as 22 and 23 will form a standing wave 24 on the diameter. That is to say, the lasing element will in this case generate a standing spherical wave in the chamber 25. In FIG. 5., an opaque, spherically reflecting region centered focally is represented by 26, and if the time-constant is long as that of FIG. 4., then the reflection of the convergent wave from the opaque region 26 will result in a spherical standing wave portions of which are represented by 27. The steady pressure on any concentric surface will be in the ratio $$P_r/P_R = (R/r)^2$$

as previously given. In FIG. 6., the time-constant is short compared to the time taken by a wavelet to traverse a diameter, and a standing wave cannot be formed which fills the entire chamber 25; a transient partial standing wave will be formed at various radii as the spherical wave converges, traverses the center, and diverges to return to the lasing element. In this case the spherical wave will bounce back and forth through the center, and a partial standing wave, portions of which are represented by 29 will be formed within the chamber 25 but on the inner surface 28 momentarily, and in the focal region momentarily as represented by 30. In FIG. 7., a reflecting region 26 is centered focally, and if the time-constant is short as that of FIG. 6., then the reflection of the convergent wave from the surface 26 results in a momentary partial standing wave 31. In the latter two cases the pressures at any radii can be calculated using the previous equation.

Spherical symmetry represents the most efficient concentration of convergent energy. By the use of a spherical as well as other focusing symmetry lasing element concentration of electromagnetic energy to densities far exceeding any known to exist in the cosmos can be achieved, as well as concentration of energy to greater densities than that found in matter itself. Impinging such a wave on matter can therefore subject it to supracosmic temperatures and pressures beyond any attainable by any other means. Similarly for electromagnetic field strengths. A consequence is that the kinetic temperatures, pressures, and alternatively electromagnetic field strengths required to transmute chemical elements over the whole range, both known and unknown, can be obtained.

A lasing lamina not necessarily having symmetry can be used to line the walls of a thermodynamic reaction chamber of any type wherein electromagnetic energy is released by the reaction; such a lasing wall would return substantial amounts of radiant energy to the reaction that would otherwise be lost to a nonlasing wall. For example, a Stellarator might be lined with a lasing element to reduce radiation losses.

THE PROCESS

The process and some forms of action subsumed thereunder are described for a closed spherical geometry. It is to be emphasized that this invention is not to be construed as being limited to the specific process forms and geometric symmetry described inasmuch as other forms of action and geometry will occur to those familiar with the relevant arts and which fall inherently within the range and scope of understanding of this disclosure. For example, in the process form to be described, the region of reaction will be taken as reflective to the incident radiation, however, it is not the only condition under which the process can proceed. This can be seen if it is recognized that the momentum imparted to an opaque, absorptive region by a single impingent photon is $$p_o = h/\lambda,$$

whereas the momentum imparted to a perfectly reflective region is $$p_r = 2h/\lambda = 2p_o;$$

these relationships arising as a consequence of a change of momentum on total absorption and twice that change in momentum on total reflection. In the case of a moving boundary such as can occur in the process, the momentum imparted will be $p$:

$$p_o \leqq p \leqq 2p_o.$$

Reactions involving matter and temperature are classified and defined thus: (1) heat absorbing = endothermic, (2) heat evolving = exothermic, (3) neither heat absorbing nor heat evolving = equithermic. For the higher temperature ranges obtainable with the disclosed process and involving matter transformations typified as thermonuclear fusions the analogous definitions are, respectively: (1) endofusive, (2) exofusive, (3) equifusive. Although all of these types of reactions are procureable with the disclosed device, all subsequent discussion in this disclosure will be, with few exceptions, in terms of thermofusion, thermofusion being defined as encompassing reactions which are thermonuclear or transmutative. Thermofusion is stressed particularly to draw attention to the importance of the invention to that area of usefulness. Other areas of utility are discussed also. The invention was devised to produce and control thermonuclear or transmutation reactions applying to the whole range of known and unknown chemical elements as well as elementary particles. The process is applicable to the entire temperature range from 0°K to oo°K.

The general process: a substantially closed, spherical, convergent, coherent electromagnetic wave is generated and compresses and heats matter to endo-, exo-, equi-fusive or combinations thereof conditions, consequential divergent energy forms being utilized for useful purposes externally as well as for feedback to the spherical wave generator for production of succeeding electromagnetic waves for continuing the process in steady state.

The process in more detail. A spherical, closed, convergent, coherent electromagnetic wave is generated, and as it propagates toward its focal center its radiant momentum compresses and heats, and its radiant energy heats, matter in its path thereby increasing the matter density and temperature toward the focal point. During the heating and compression a stage is reached in which the region compacted acquires whitebody characteristics, causing reflection of the impinging electromagnetic wave thus producing a spherical standing wave at the region's surface. So long as the convergent component of the coherent electromagnetic wave persists, the standing wave will both compress and heat the region further, such compression and heating being cumulative increasing functions of the diminishing radius of the compacted region. During the pressure and temperature increase, the energy density in the compacted region increases and thermalization, that is, mixing of the matter particles toward thermal equilibrium at the instantaneous temperature, occurs. Under continued compression, a stage will be reached at which the pressure in the compacted region balances the convergent radiation pressure, and no further compression takes place. The pressure equilibrium state continues steadily or momentarily according as the magnitude of the compacting radiation pressure persists or diminishes, after which the region expands and cools toward the initial conditions extant before the compression took place. The first or compression phase, and the second or expansion phase comprise one cycle of process operation, and if an exofusive reaction occurs during compaction or compression, energy is released above that amount required to carry the process through the first phase; there can therefore be, at the end of the second phase, more energy present than originally. Part of such energy, being divergent, is fed back to the spherical wave generator to provide energy for another cycle of the process operation. Introduction of fresh, unfused matter is made continually, and removal of fused matter with an unavoidably intermixed quantity of unfused matter is also made continually, and the distribution of mixed matters is made automatically by the kinetic circulation of such matters throughout the reaction chamber during and between phases. A differential pressure between the source of freshly admitted matter and the sink for removed matter is the cause of continuous flow into and out of the reaction chamber.

The reaction chamber is a spherical volume $V_i$ in the central locale of which the fusion part of the process proceeds, and the initial low temperature $T_i$ priming energy $E_i$ consists of the amount making up the energy of the latent spherical wave plus the residual amount in the chamber at $T_f$. That is to say, an initial energy $E_i$ is coruscated into the chamber from an external source; this amount is equivalent to a kinetic temperature $T_i$; part of this energy saturates the spherical wave generator to eventually become the required spherical wave; part of this energy remains in the chamber as heat at temperature $T_f$:

$E_i = E_f +$ energy converted into spherical wave.
Using Planck's law:

$$E_i = 8\pi \frac{h}{c^3} \iint_{V_i} \int_{\nu=0}^{\nu=\infty} \frac{\nu^3}{\exp(\frac{h\nu}{kT_i}) - 1} dV_i\, d\nu .$$

Matter heated to a temperature $T_t \gg T_i$ and compressed to a volume $V_t \ll V_i$, when thermalized, consists of energy total $E_t$:

$$E_t = 8\pi \frac{h}{c^3} \iint_{V_t} \int_{\nu=0}^{\nu=\infty} \frac{\nu^3}{\exp(\frac{h}{kT_t}) - 1} dV_t\, d\nu .$$

These two equations represent the state of energy in the matter at the initiation and completion of a compression, respectively. $T_i$ is the kinetic temperature at the instant the spherical wave begins its compression and is the state throughout the chamber initially; $T_t$ is the kinetic temperature in the compacted region after the compression has taken place, it is the state in a relatively small volume region centered in the region centered in the reaction chamber volume and is remote from any chamber architecture and therefore cannot in spite of its high temperature injure such architecture during normal process operation. An analogous equation holds for the state of energy in the chamber after expansion and cooling, however, in the steady state operation of the process, the end of an expansion phase will be the beginning of the next compression phase and therefore the first of these two equations will apply. For transient operations such as starting up and shutting down the equations can be modified accordingly. Three conditions can occur depending on the energy gain properties of reactants and energy abstracted for external use:

1. $E_t \ll E_i$ in endofusion,
2. $E_T < E_i$ in equifusion,
3. $E_t \leq E_i$ in exofusion.

In the case of exofusion it is readily seen that the energy density and therefore the total energy in the chamber at the conclusion of a second, or cooling, phase can be made to be equal to or greater than the original energy and therefore the temperature made correspondingly equal to or greater than the original temperature $T_i$ more or less according to the process requirements at the beginning of the new first phase of action. An example of an exofusive reaction is one which uses Deuterium ($H^2$) and Hydrogen ($H^1$) as reactants. By-products of this reaction are Helium ($He^3$) and gamma rays ($\gamma$). Thermalization under radiation pressure converts substantial amounts of the gamma radiation to high temperature spectral radiation. For very small reaction volumes in the order of atomic dimensions, the gamma radiation will be released substantially intact as gamma rays, while for larger reaction volumes the amount of gamma radiation released will be proportionally less according to the amount of thermalization taking place. For the reaction described, the chemical (or thermonuclear) equation is:

$$H^2 + H^1 \rightarrow He^3 + \gamma$$

with a release of more than $1.65 \times 10^{11}$ joules of energy per gram of reactants, equivalent to more than 80 tons of TNT. Such exofusive reactions can release enough energy to incinerate the device or cause catastrophic explosion and steps must be taken to preclude that possibility unless, of course, the device is to be operated as a thermonuclear bomb. The manner of starting up the device ensures safety and will be explained in the section on the embodiment. Furthermore, because of the tremendous pressures and temperatures concentratable in this device process, if the initial reactant density is great enough, then a reaction excited focally to pressures and temperatures far in excess of those required to carry on a minimum fusion reaction could result in a fusion shock wave, that is, an exofusion wave propagating divergently feeding on raw reactants. The exofusion wave is a form of detonation and would be an alternative means of obtaining thermonuclear bombs.

Figure 8:
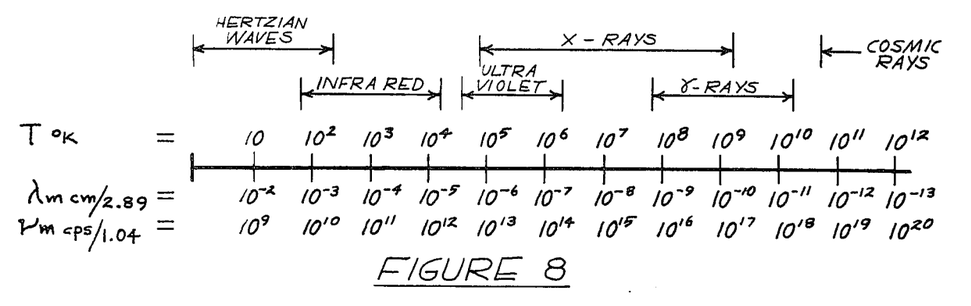
FIG. 8 is a partial nomograph showing the Wien's Law mean radiant frequency and its corresponding wavelength, as function of the kinetic temperature, as well as conventional appellations in use for various frequency ranges.

Wien's displacement law states that the mean frequency of radiant energy in a heated region increases proportionally with the temperature:

$$\nu_m = (cT)/b \text{ or } \lambda_m = b/T$$

where $\nu_m$ = mean spectral frequency at kinetic temperature T,
$\lambda_m$ = mean spectral wavelength at T,
$b$ = Wien's constant = 0.289 cm°K,
$c$ = *velocity of light in cm/sec*,
T = kinetic temperature of the region.
From these equations it follows:

$$\frac{(\nu_m)_t}{(\nu_m)_T} = \frac{t}{T} = \frac{(\lambda_m)_T}{(\lambda_m)_t}$$

where the subscripts t and T signify an initial low temperature and a later high temperature, respectively. From this it follows that: (1) in the exofusive case, the mean frequency of radiant energy can be higher at the conclusion of a process cycle than it was at the beginning of the cycle, (2) in any type of fusion or heat reaction, since the temperature in the compressed region can be greater by any order of magnitude than the initial temperature, the corresponding mean spectral frequency can be made higher correspondingly, and therefore any high temperature reaction obtainable with the process of this disclosure becomes a source of high frequency radiation and indeed there is a frequency for each temperature procureable. The process is therefore a means of generating such electromagnetic frequencies. FIG. 8. is a partial nomograph showing correspondences as derived from Wien's displacement law between $\nu, \lambda$, and T, and applicable to this invention.

If the energy density in the region of the focus of the convergent spherical wave is made greater than the energy density of mass as calculated from Einstein's $E = mc^2$ equation, then the radiant energy can condense into mass and therefore form matter. Direct transformations of energy into matter are known for photons meeting head-on, and the convergence of the photon electromagnetic wave in the process of this disclosure is an example of such collisions between photons, and the process and embodiment is a means by which such transformations can be accomplished. The process and embodiment are means of generating energy densities greater than that inherent in mass, or many times greater.

THE EMBODIMENT

Figure 9:
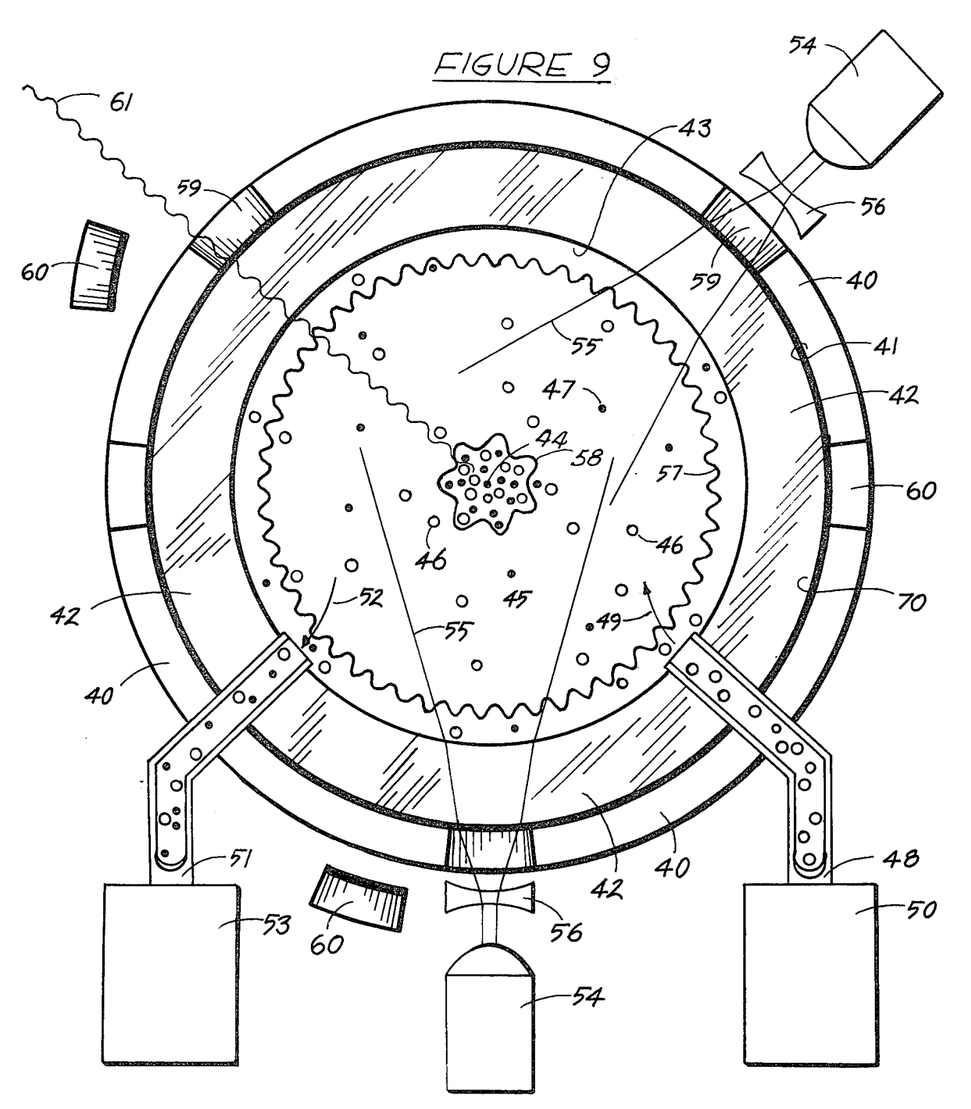
FIG. 9 represents in cross-section a closed spherical embodiment of the invention and process, with pertinent means adduced.

One of many possible reductions to practice constitutable from means readily available from the contemporary technology and embodying the heretofore herein described principles and process is illustrated configurationally in FIG. 9., wherein like numerals represent similar parts. Certain means adduced, because of their already strong and lasting establishment in technology, will be superficially described, but with sufficiency pertinent to this disclosure and will thereafter be referenced as well known. Other means are omitted inasmuch as they will readily occur to those of ordinary skill; such are for instance fittings, means of support, and attachment devices. Furthermore, the embodiment described is not to be taken as limiting the invention or claims to the geometry or configuration indicated, as other embodiments falling within the scope of this invention will readily and naturally occur, with suitable modifications, to those skilled in the relevant arts; such are for example cylindrical, toroidal, or ellipsoidal geometries; multilaminar, composite, or multiconfigurational lasing elements; and lasing elements using liquids, gases, or plasma means of generation of laser action and means of construction of such elements. The form of embodiment is intended to exemplify what is believed to be the most efficient reduction to practice attainable with the present arts and is not intended to delimit other forms which would be obvious to those skilled in the several relevant and progressing arts, and falling within the scope and claims of this invention.

FIG. 9. illustrates a cross-sectional view of a spherical laser reactor and its concomitants; representations of means of supply, regulation and influx of raw fuel reactant materials entering into the fusion process; representations of means of drain, regulation and efflux of fusion byproducts; representations of, and various means of, harnessing released energy for external use; means of regulation of efflux of electromagnetic energy as a control means; and means of ignition of an initial fusion reaction, or of fusion of the endothermic type. 40 is a heat conducting spherical shell whose inner surface is lined with electromagnetically reflective material which forms a convergent speculum 41. 42 is a spherical lamina constructed from lasing material such as Neodymium glass or any other material having lasing properties as for example ruby, and whose outer surface 70 is reflective and contiguous to the speculum 41 and whose 42 inner surface 43 is substantially emissive, the lamina 42 and its reflecting surface 70 and emissive surface 43 being a lasing element wherein lasing action takes place in a manner as to generate and emit a spherical, convergent, coherent electromagnetic wave toward the focal center 44 as determined by the lamina 42 geometry and boundary surface conditions.

The methods of manufacture of rubies have been well known for generations and consists principally of projection of ruby raw material powder and dopants through an oxyhydrogen flame wherein melting occurs. The melted material impinges on some object whereon it solidifies in ruby form. The same technique can be used to build up a lasing lamina 42. TO make a ruby lasing element of the spherical shell type, deposition of the molten materials would be made on a spherical mandrel. The mandrel would be rotated with the same type of motion used in winding golf balls, and kept at the proper environmental conditions while the material is continuous deposited until the desired thickness is obtained. A suitable hole can be cut and the mandrel removed by chemical or other means. The inner and outer surfaces can be finished by modern electronic polishing techniques which can control surface contours within atomic or molecular accuracy, these techniques are currently applied to polish lenses to mathematical accuracy required for their use in high-altitude cameras. The inner and outer surfaces can then be prepared as is well known in the laser arts, to result finally in a lasing element of the type required in the embodiment described herein. Ruby is chosen here to exemplify the embodiment, for convenience in associating subsequently given calculations based on actual experimental results with ruby lasers; other materials chosen for use in the lasing elements encompassed by this invention will require obvious techniques indigeneous to the particular materials and configurations selected.

45 is a spherical chamber delineated by and enclosed within the combination of shell 40, speculum 41, and lamina 42, whereinto such chamber is introduced and processed raw fuel fusion reactants, whatever their nature and specification, the particles of which raw reactant materials are represented by small circles 46, and wherein such chamber 45 is also found sundry byproducts of the fusion, whatever their nature, the particles of such byproducts are represented by small dots 47. Raw materials 46 are introduced into and pressurized if necessary, within the chamber 45 by efflux as represented by the arrow 49 from an adit pipe 48 (shown in partial section) which penetrates into the fusion chamber 45 from without through the shell 40, speculum 41, and lamina 42. The efflux 49 and its pressurization originates from a source reservoir 50 which has a supply of raw materials 46 and a pump means of transferring the raw materials 46 from storage into the adit pipe 48 under pressure; such a system comprising the reservoir 50 and its accoutremental storage, pump, pressurization, and control and regulation devices being one of many well known and obvious in the relevant art. Removal from within the fusion chamber 45 is accomplished by influx as represented by the arrow 52 into an exit pipe 51 which penetrates into the chamber 45 similarly to the adit pipe 48. The influx 52 from the chamber 45 terminates in a sump reservoir 53 which has located within a container into which is pumped the byproducts 47 and an unavoidably admixed quantity of raw materials 46; the system comprising the sump reservoir and its accoutremental storage, pump, pressurization, and control and regulation devices being one of many well known and obvious in the relevant arts.

59 is representative of a plurality of orifices penetrating the shell 40 and speculum 41, and through which electromagnetic energy is introduced into the chamber 45 during the priming process required to initially pump up the energy states of the lasing lamina 42, and also through which electomagnetic energy generated during a fusion is allowed to escape in more or less quantity and direction according to the positioning of the one or more adjustable plug sectors 60 or the like.

54 is representative of a source of spectral energy or radiant energy containing a range of frequencies from which the lasing lamina 42 can operate. The lines 55 represent a burst of such electromagnetic energy projected into the chamber 45 and spread out therein by means of the concavo-concave lenses 56. The source of energy 54 can be a flashlamp, or a laser or the like.

The most primitive fusion obtainable with this embodiment requires cooperation in combination between the raw materials 46, the fusion chamber 45, one or more simultaneously injected radiant priming bursts 55, the spherical lasing lamina 42 with its reflective outer surface 70 and the lasing element comprised thereof with its most pertinent and specific property of generation of spherically convergent coherent electromagnetic waves arising out of its spherical geometry. A portion approximately one wavelength thick of such a spherical wave as the portion might appear momentarily after convergent emission from the inner surface 43 of the lamina 42 is represented by the wavy circle 57; the waviness being utilized in the drawing suggestively and not necessarily to represent any physical structure inherent in the wave or the wavefronts they represent other than sphericity. The absolute magnitudes $$\frac{|\vec{E}_r|}{|\vec{E}_R|} = \frac{|\vec{H}_r|}{|\vec{H}_R|} = \frac{u_r}{u_R} = \left(\frac{R^2}{r}\right)$$

of the vector relationships previously given, apply: r is the radius of the smaller spherical portion 58 of the convergent spherical wave and R is the radius of the larger, earlier spherical portion 57 of the same wave.

A fusion reaction is obtained in the following manner. The fusion chamber 45 is primed with raw fusion materials 46 by means of the source reservoir 50. A burst of priming electromagnetic energy 55 is coruscated into the chamber 45 from the suitable electromagnetic energy source 54 or a plurality of such sources 54. This or these sources 54 might be a flash lamp or another laser which operates at the same range of frequencies as those of the lasing lamina 42. The radiant energy burst 55 of amount $E_i$ propagates throughout the chamber 45. Part of this energy, $E_I$, goes into heating the raw materials 46, a part $E_l$ goes into exciting the energy states of the lasing lamina 42, and a part $E_L$ goes into inevitable losses such as heating of the lamina 42 and heating of the shell 40 and radiation therefrom. Therefore:

$$E_i = E_I + E_l + E_L.$$

After a time, the electromagnetic energy density within the chamber 45 diminishes due to reduction of the output from the energy source 54 and losses from the device itself, and ultimately a stage is reached in which the depletion has dropped the energy density below that required by laser action to maintain the energy states in the lasing lamina 42 in a state of saturation, thereafter which the lasing element of which the lamina 42 is part will begin to emit its characteristic spherical, convergent, coherent electromagnetic wave. Also, the speculum 41 assists in returning non-lasing energy to the chamber. The wavy circles 57 and 58 represent portions of such a laser wave. This wave compresses and heats materials it intercepts in its convergent trajectory, to fusion conditions.

The portion 57 of the electromagnetic wave has in addition to its spatio-temporal characteristics of wavelength, coherence, sphericity, and convergence the following pertinent properties: (a) a quantity of energy, (b) a quantity of convergent momentum from which arises the radiation pressure, (c) magnitudes of electric and magnetic field intensities. These entities are related in some commensurate balance of initial magnitudes which later assume a different balance because of the part played by each as they enter into their respective roles in producing fusion. A part of the energy of the spherical wave is scattered by the particles 46 and 47 and ultimately heats them by dissipation of such energy; such scattering alone could heat to fusion temperatures. A part of the momentum of the spherical wave is imparted to the particles 46 and 47 causing them to converge compressively toward the focal center 44, thereby causing them to compaction; such compression alone can induce fusion. The field intensities initially extant in the portion 57 of the convergent wave of initial radius R are increased in the relationship given above and acting alone could cause disruption of the particles 46 and 47 suffient to cause fusion. Cosmic magnitudes of energy, energy density or pressure, momentum, and field intensities can be designed into a convergent, coherent electromagnetic wave, such wave being obtainable with the embodiment illustrated; it is known for instance that with conventional lasers, supracosmic temperatures, momenta, pressures, and field intensities can be attained beyond any known to exist in the universe. These phenomena, acting alone or in concert, establish conditions in which fusion is induced in this invention.

Endothermic fusion (endofusion) will absorb energy from the incident convergent electromagnetic wave, and the energy in the chamber 45 after completion of an endofusive cycle will be less than that originally projected into the chamber. Exofusion will release energy, and the energy in the chamber 45 at the conclusion of an exofusive cycle can be made to be considerably greater than that originally projected into the chamber and can be used to furnish feedback energy to the lasing lamina 42 for the processing of another cycle of process operation. A mixture of endofusive with exofusive raw materials can be used to attain transmutation and still provide enough feedback energy to sustain steady state process operation. Also, in the instance of exofusions, to prevent catastrophic operation, mordants can be added to the raw reactant materials to absorb excessive exofusive energy and so limit energy production to only that amount required to carry on the process safely. Such mordants can be alien matter or even byproducts of the reaction under way; the endothermic portion of an exo/endo mixture can be looked upon as mordant matter, in which circumstance the process can not only produce useful energy but also useful byproducts as well.

In addition to the control afforded by the regulatory means inherent in the source reservoir 50 and the sump reservoir 53, the orifices 59 cooperating with their positionable plugs 60 provice control over the process taking place within the chamber 45. The orifices 59 and their positionable plugs 60 have a manifold or purposes. The intensity of the reaction can be controllably regulated by allowing a portion of the feedback energy to escape more or less as desired. One or more orifices can be used to inject initial electromagnetic energy into the chamber 45 during experimental or start-up conditions. Useful energy in radiant form to be converted externally into any desired form can be allowed to issue from one or more orifices 59. Also, emerging energy as represented by 61, since it carries with it an amount of momentum, and compliance of such momentum requires according to the general laws of conservation of momentum, an equivalent amount of momentum be carried oppositely directed by the generating system, then a net magnitude of momentum projected out of the chamber 45 will impart an equal impetus to the fusion device and therefore the device can be utilized as a means of propulsion.

Calculations follow which give the radius in the focal region 44 of the chamber 45 within which both the temperature and pressure required to carry on a known exofusion reaction are exceeded. They are made for an embodiment of the type described in the previous paragraphs having a spherical chamber 45 of 5 ft radius and a lasing lamina 42 6 inches thick made of ruby lasing material of the type used in the experiments by Gregg et al[1]. The calculations also use empirical results from the same writers.

The chamber 45 dimensions, the lasing lamina 42 dimensions and reaction materials and other parameters are not to be understood as limiting the invention and embodiment to those selected. Similitude relationships can be derived to construct embodiments developing higher or lower temperatures and pressures and using the whole range of known and unknown chemical elements as fusion materials, and lasing elements using materials having greater or lesser energy emission characteristics than that described herein are well known, and lasing elements are not restricted to the spherical kind hereindescribed but all types of geometry are applicable, as are also all types of lasing media.

The reaction considered uses the previously described $H^2 + H^1$ combination of raw materials as reactants and requires, under exofusion conditions:

particle density of $2 \times 10^{15}$ per $cm^3$,
fusion temperature of $10^8 \, °K$,
compaction pressure of $1.6 \times 10^8$ dynes/$cm^2$ = ergs/$cm^3$.

The Gregg experiments used a ruby lasing rod of ½ inch diameter and 6 inches long which emitted a burst of electromagnetic coherent energy in about $7 \times 10^{-9}$ seconds. The laser beam was focused conically on various materials and the kinetic temperatures obtained thereby measured. An empirical equation was then formulated from the data obtained relating the temperatures obtained, to atomic weight and incident electromagnetic energy, for a focal area corresponding to a radius of 0.033 cm.

A lasing lamina 42 of 6 inches thickness and 5 ft inside radius would project, if made of the same lasing material as used in the Gregg experiment, $4.22 \times 10^{12}$ ergs of coherent electromagnetic energy into the chamber 45 volume in about $7 \times 10^{-9}$ seconds between half-power points. Therefore, the time-constant of the lasing element of which the lamina 42 is part is about ½ the time required for traversal of the chamber 45 diameter and it may be assumed for the purposes of calculation of radiation pressure, that all of the projected energy of $4.22 \times 10^{12}$ ergs fills the chamber 45 volume momentarily. Now the energy density in the chamber 45 is a function of the radius as previously shown. Therefore;

$$u(r) \text{ ergs/cm}^3 = K/r^2$$

where $K$ is a constant to be determined.
The total energy projected into the chamber 45 from the lamina 42 is therefore:

$$U \text{ ergs} = \int_V \frac{K}{r^2} \, dV \text{ where the volume } V = \frac{4}{3} \pi r^3.$$

Therefore $$dV = 4\pi r^2 \, dr, \text{ and } U = 4\pi K \int_{r=\lambda}^{r=R} \frac{r^2}{r^2} dr, \text{ from which}$$

$$U = 4\pi K \int_{r=\lambda}^{r=R} dr = 4\pi K \, r \Big]_r^R \text{ where } R >> r = \lambda.$$

The wavelength $\lambda$ is the limiting dimension to which the energy can be focused and was 4000 Angstroms = $4 \times 10^{-5}$ cm and the integration becomes:

$$U = 4\pi KR$$

where $R = 5$ ft $= 152.4$ cm.
Using the value of the total energy $U = 4.22 \times 10^{12}$ ergs and R as given, $K$ is calculated to be:

$$K = 2.24 \times 10^9 \text{ ergs/cm},$$

from which $$u(r) = \frac{2.24 \times 10^9}{r^2} \text{ergs/cm}^3.$$

This equation states that the energy density at the surface of the lasing lamina 42 is $$u(R) = 2.9 \times 10^5 \text{ ergs/cm}^3 \text{ or dynes/cm}^2.$$

From the value of $u(R)$ and the previously derived relationship $$P r = P_R(R/r)^2$$

the following pressures are calculated and tabulated showing the radii at which they occur;
$P(R) = 2.9 \times 10^5$ dynes/cm$^2$,
$P(r_c) = 1.6 \times 10^8$ dynes/cm$^2$ where $r_c$ is the radius below which the minimum pressure required for fusion is exceeded, and $r_c = 6.41$ cm,
$P(\lambda) = 4.2 \times 10^{18}$ dynes/cm$^2$, the maximum pressure due to radiation pressure attainable with a wavelength $\lambda = 4000$ A.

Determination of the radius below which the required fusion temperature of $10^8$ °K is exceeded is made in terms of the Gregg empirically derived equation:

$$T = \tfrac{1}{2} M^{0.8} \times P^{(0.6/M^{0.09})} = \tfrac{1}{2} M^{0.8} \times P^z$$

where
$T =$ kinetic temperature in the focal area,
$M =$ atomic weight of the subjected materials,
$P =$ (in this -derivation only) electromagnetic intensity of the laser radiation,
$z =$ the exponent $0.6/M^{0.09}$.
For the reaction under consideration:
$M \approx 2$ from which
$z \approx \tfrac{1}{2}$.
Taking ratios for different equation parameters:
$T_r/T_R = (P_r/P_R)^{1/2}$, and since convergent $P$ varies inversely as $r^2$, then $$T_r/T R = (R^2/r^2)^{1/2} = R/r.$$

Temperatures corresponding to different intensities focused on the same area are derived similarly and are:

$$T_1/T_2 = (P_1/P_2)^{1/2}$$

where the subscripts distinguish the different intensities.
The ratio of the mean area of the lasing lamina 42 emitting surface to the area of the Gregg experiments is $2.52 \times 10^5$ for a lamina 42 of radius of 5 ft. This ratio is the equivalent ratio of coherent intensities of energy projected on the same area and, inserted in the last equation along with the temperature attained with the laser rod which was $8 \times 10^5$ °K, the resultant temperature obtainable with the lamina 42 would be $4 \times 10^8$ °K. The area in the Gregg experiment was a circular area, while the area in the process embodiment is a spherical area. The ratio of the radii for the same area of a sphere as that to a circle is $\tfrac{1}{2}$, and so the temperature obtainable with an embodiment of the dimensions given is $4 \times 10^8$ °K at a focal radius of $0.016 = \tfrac{1}{2} \times 0.033$ cm. Using the next previous equation and the required temperature of $10^8$ °K for the exofusive reaction under consideration, one obtains $$r_t = 0.064 \text{ cm}$$

as the radius below which the temperature exceeds the minimum temperature for fusion with the reaction given. The following temperatures and radii at which they occur are tabulated:

$T_f = 10^8$ °K, the minimum fusion temperature required, and which occurs at a radius of $r_t = 0.064$ cm,
$T = 1.3 \times 10^{11}$ °K, the maximum temperature obtainable as limited by the wavelength of the radiant energy
$= 4000$ A, and which occurs at a radius $r = 4 \times 10^{-5}$ cm.

Therefore, from these considerations, for the non-exclusive embodiment described herein, the required fusion temperature and pressure can be exceeded for a given thermofusive reaction at and below a radius 0.064 cm for the temperature, and at and below a radius 6.41 cm for the pressure. The common radius below which both the temperature and pressure are exceeded is 0.064 cm.

Inasmuch as actual results sometimes deviate from theoretical considerations, the calculations given were predicted partly on experimental observations so as to bring more into evidence actual parameters to be expected. The invention disclosed herein is not to be understood as depending on any particular theoretical description; it is to be understood as dependent on properties inherent in matter and various forms of energy as experienced through many years of manifold observation and experiment.

To gain an insight into the cyclic operation of the device, it must be understood that there is an analogical correspondence between the cooperating elements of the device and those of an oscillator/amplifier. Such an oscillator/amplifier requires:
a. a medium to be amplified,
b. a reactive element,
c. an amplifier with feedback,
d. a power supply.
The medium to be amplified in the laser reactor is the $\vec{E}\times\vec{H}$ current; That the $\vec{E}\times\vec{H}$ current is a suitable medium follows from the fact that it is the $\vec{E}\times\vec{H}$ current that is amplified in laser amplifiers. The reactive element in the device is the lasing lamina; that a lasing lamina is a suitable reactive element is evident from the property that it has in common with all reactive elements, that of storing energy and releasing it (sometimes typified in parlance as the "flywheel effect"). Amplification is obtained on the $\vec{E}\times\vec{H}$ current in the fusion itself, taht is, the fusion region is the amplifier, and can have amplification factors $A \lessgtr 1$. In endofusion, the amplification factor $A$ is less than unity:

$$A_{endo} = (\vec{E}\times\vec{H})_{outflowing}/(\vec{E}\times\vec{H})_{inflowing} < 1.$$

In equifusion, the energy released just balances the energy absorbed:

$$A_{equi} = (\vec{E}\times\vec{H})_{outflowing}/(\vec{E}\times\vec{H})_{inflowing} = 1.$$

In exofusion, the energy released exceeds the energy absorbed:

$$A_{exo} = (\vec{E}\times\vec{H})_{outflowing}/(\vec{E}\times\vec{H})_{inflowing} > 1.$$

The power supply in the device is the reactant fuel itself. Since all of the conditions for amplification can be obtained, and the feedback loop is from the amplifier (fusion region) to reactive element (lasing element) to amplifier (fusion region), it follows that the well known and substantiated body of doctrine relating to the theory of oscillators applies. The laser reactor can be made, therefore, to oscillate and operate in the steady state. For the particular parameters given in the exemplified embodiment, the time of the first phase is approximately the time-constant of the lasing lamina 42 (the reactive element) and is about $7 \times 10^{-9}$ seconds; the time of the second phase will be comparable to that of the first phase because of the propagation time of light, so that the time of a complete cycle will be about $14 \times ^{-9}$ seconds, which corresponds to an operating frequency of $71.5 \times 10^6$ cycles per second = 71.5 megacycles/sec. This is the frequency of the laser reactor process cycle, not the photon frequency of the lasing lamina 42 electromagnetic emanations. The laser reactor is therefore an oscillator which operates from an exofusion reaction and is therefore a source of cyclically emanating energy.

The number of particles (particle density) determines kinetics of a thermodynamic reaction. In the case of thermonuclear reactions and the like the initial pressure required to obtain the proper particle density at the appropriate temperatures are well known. However, in the laser reactor of this disclosure, initial ignition of an exofusive fuel might cause catastrophic explosion: an initially transient pressure exceeding the confinement (compaction) pressure could cause detonation by propagating outwardly in the form of a divergent exofusion wave feeding on unused fuel. The device is in close resemblance to a fusion bomb (H-bomb, for instance) and measures should be taken to assure that detonation conditions (excessive overall particle density and radiation pressure) are precluded. The device can be operated safely by the manner of starting it up. A mordant is introduced into the raw fuel. A mordant for the particular reaction cited might be oxygen, for example. Mordants result in radiation losses in the reaction and consequently can be used to more than critically dampen any otherwise uncontrollable fusion wave. The startup operation can proceed as follows. With the reaction chamber 45 primed with fuel reactants containing mordants, the chamber 45 is flashed by the external electromagnetic energy source 54 in successive pulses as the fuel is progressively enriched by diminishing the mordant content of the incoming fuel. The fuel is removed from the chamber in the same quantity that fresh fuel enters, with the result that ultimately an incipient fusion occurs, thereafter which the incoming fuel can be enriched to the degree required to carry on continuous operation. The flow rate will be at this point as required for steady operation. Controllable losses can be introduced not only by mordants, but also by diminishing the energy available to the reaction by means of the orifices 59. Full control of any reaction can therefore be achieved by mordant regulation, regulation of differential and absolute pressure between source 50 and sump 53, regulation of flow rates, and regulation of closeable orifices. Useful byproducts are those chemical elements and/or compounds transmuted or synthesized in the chamber 45. Useful heat energy can be extracted from the laser reactor by an affixed heat-exchanger well known to the art such as 90 affixed to the shell 40. The mean frequency of the electromagnetic energy emitted will depend upon the temperature of the particular reaction and such frequency energy can be obtained through one or more orifices 59. Coherent energy of the range of frequencies in which the lasing lamina 42 operates can also be extracted through the orifices 59; the laser reactor, when operated in this way, then becomes a novel laser whose excitation source can be a thermonuclear or any other high temperature reaction and as such is capable of generating laser beams of enormous energy far greater than that originally required to ignite incipient fusion. Furthermore, in cyclic operation, radiant energy can be extracted at the process cyclic rate and thus the laser reactor is also an optical or radiant oscillator capable of emanating energy whose mean radiant frequency is dependent on the temperature of the reaction and whose cyclic period is dependent on the process operating frequency.

An analogical description of the process action has been given in terms of oscillator theory; a phenomenological description follows. The description is one of many possible process actions of which the embodiment is capable and is not to be construed as limiting the process to that described for the particular embodiment elaborated within this disclosure. There are many courses which process action can take, all falling inherently within the embodiments possible in this invention. One example of an effect which can occur in process action is the self-focusing of electromagnetic energy extant within the chamber 45. This effect is known in physical optics and has its origin in the bending of electromagnetic rays towards the region of increasing index of refraction. In the laser reactor, inasmuch as the density of compressed matter increases toward the focal center during the first phase of process action, and inasmuch as the index of refraction tends to increase with the density of matter as for example in the terrestrial atmosphere, then it follows that focally directed electromagnetic energy as well as scattered similar energy having a direction deviating from the focal direction at most tangential to a confocal spherical surface will bend toward the center; thus a substantial portion of any scattered electromagnetic energy will tend to converge to the center in some proportion commensurate to the increasing matter density. The convergent energy density therefore tends to be self-focusing and self centering, thereby contributing to increasing the effectiveness of the laser reactor process.

In the following phenomenological description, it is assumed that the reaction chamber 45 is primed with an exofusive composition similar to that previously given. The chamber is then flashed by means of the external energy source or sources 54 so as to saturate the states of the lasing lamina 42. As the injected energy 55 begins to decrease, the lasing lamina 42 states can no longer hold in saturation, and the lamina 42 will begin to emit convergently and coherently. The actual building up of convergent and coherent emission 57 occurs as follows. As soon as the projected energy intensity decreases at the inner surface 43 of the lasing lamina 42, atoms there will begin to emit their characteristic radiation. This radiation will spread out, the portion of immediate interest being that which propagates within the lamina 42. It can be seen by a Huygen's construction (or alternatively, the principle of least time) that for waves thusly spreading out from any given point on the inner surface 43, the most probable lasing mode to occur will be that which is radial, since the reflection from the point on the lasing lamina outer (reflective) surface 70 geometrically radially projected from the given point is the reflection which occurs in the least time. (If one examines the procedure for reflections from a plane surface positioned tangentially to the described outer point on the reflective surface 70 one sees immediately that the probability per unit area of establishing a planar mode is much less than that for the radial, spherical mode.) Also, from the well known "hogging" characteristics of initially established lasing modes, it follows that the principal part of the lasing energy will propagate radially within the spherically constructed lasing lamina 42, thus generating a spherical convergent electromagnetic wave. Any non-radial modes which attempt to establish themselves can do so only if they are in the proper phase relationship with all radial modes they intersect; their components perpendicular to the radii will as a whole tend to cancel out throughout the lamina 42 by spherically symmetric interference, while their components parallel to the radii will as a whole become part of the radial modes, and this resolution of the non-radial totality of modes into component modes perpendicular and parallel to the radii is the cross-coupling action which synchronizes the totality of radial modes to produce spherical coherence. Thus the spherical, convergent, coherent electomagnetic wave, portions of which are represented by 57 and 58, is produced as required for process action.

As the convergent wave 57 progresses toward the center 44, it imparts progressively stronger convergent momentum to successive particles 46 and 47 it traverses. Furthermore, as the wave 57 propagates toward the center 44, it imparts progressively higher kinetic temperature to successive particles it traverses. At some radius both the temperature and pressure will exceed those required to produce fusion, in this case exofusion. Also, at this instant of action, substantially all of the particles in the chamber 45 will be converging toward the center 44, with their velocities varying increasively as some function of their approach to the center 44.

It should be noticed that at some radius, the pressure of the reacting particles will equal the compressive or compactive pressure of the converging wave; this will result in a standing wave since the incident converging radiation will be reflected back to the lasing lamina 42. This is a point of equilibrium for reference purposes and can occur: (1) before fusion is attained, (2) just as fusion is barely attained, (3) after fusion is attained. If, in the latter two instances, the exofusive energy released is amply sufficient to overcome the confining radiation pressure, a fusion wave can be produced which will diverge feeding on unused fuel, thereby causing a possible catastrophic explosion (thermofusion bomb). The three cases are described in more detail below.

Case 1. If the standing wave equilibrium point is reached witout producing fusion, the situation will remain substantially at this equilibrium point until the converging radiation from the lasing element diminishes beyond the holding magnitude. This will happen because of the standing wave energy being decremented as a consequence of the finite propagation constants in the path of the circulating radiation. The standing-wave ratio is therefore non-stationary. (These circumstances of action correspond to the previously mentioned analog case where $A<1$.)

Case 2. If the standing wave equilibrium point is reached just as a threshold exofusion occurs, the situation will remain substantially at this point so long as the fusion generates sufficient radiant energy to balance losses. As the reactants are used up, the reaction cools below the temperature at which the replenishing energy required to maintain outgoing/inflowing balance in the lasing element is produced; the confining pressure will therefore eventually diminish below the equilibrium pressure, the exofusion will extinguish, and further action will continue from this point similarly to that of case 1. (These circumstances of action correspond to the previously mentioned analog case where $A=1$.)

Case 3. If the standing wave equilibrium point is reached beyond the point at which exofusion occurs, then the convergent radiation pressure will have compressed and heated the reactants beyond ignition requirements. Since the temperature in the exofusive region increases beyond the temperature produced by the radiation from the lasing element, then by Wien's displacement law the net radiant energy (consisting of reflected lasing element standing wave energy and exofusive radiant energy) replenishes (pumps up) the lasing lamina 42 states toward saturation. During the moments when the lamina 42 states are being replenished, the lasing lamina 42 emanations are diminished accordingly in keeping with laser action, thereby diminishing the confinement pressure below the original standing wave point. The exofusive region will therefore expand, decreasing the reaction rate and correspondingly the radiant energy produced by the fusion. This in turn permits the lasing element to begin radiating again characteristically and to recompress the fusion region, and a sequence of similar self-regulatory compression-expansion-compression perturbations can occur. (These circumstances of action correspond to the previously mentioned analog case where $A>1$.) In this case, a part of the decrease in the reaction rate is caused by the consequential expansion of the fusion region into the non-reacting, cooler contiguous regions containing unused fuel with which it interacts, gathering an admixed quantity of fresh reactants for the next cycle of action and releasing an admixed quantity of depleted reactants and byproducts. That intermixing will occur is readily seen if it understood that the kinetic velocities of the particles at the reacting/non-reacting interface is in the order of those compounded from the kinetic temperature of the reacting particles and the kinetic temperature of the non-reacting particles. All that is required to sustain steady-state operation is that fresh reactants be introduced into the reaction chamber 45 and admixed depleted reactants be removed from the chamber. If the supply of fresh reactants is cut off, the steady reaction will continue, but conditioned decrementally by the depleting of viable reactants until the situation of case 2 is reached. The differential pressure between the source reservoir 50 and the sump reservoir 53 maintains a flow of reactants which are automatically circulated througout the chamber 45 by the compression/expansion phases of the process cycles. During compression phases, the pressure behind the compacted region is diminished and permits fresh reactants to be drawn from the source reservoir 50; during the expansion phases, the overall pressure in the chamber 45 increases, permitting the sump reservoir to draw byproducts from the chamber 45. The intake and exhaust of reactants is similar to that of a single-cycle diesel engine.

From the theory of matter, any mass defines a gravitational field, that is, has associated with it a gravitational potential.

In any fusion reaction wherein mass is transformed into its equivalent radiant energy, the radiant energy will eventually disperse, and the gravitational potential originating from the mass will likewise disperse, evanescing as a function of the propagation of the radiant energy. An original amount of fusion fuel establishes inherently an original gravitational potential, and as quantities of fuel mass are converted into radiant energy in the successive cycles of a steady state exofusion reaction, or even in a transient exofusion, the original gravitational potential will be diminished in corresponding amounts, and since a perturbation in gravitational potential results in propagation of a gravity wave, a succession of gravity waves will result from the steady state reaction. The converse, radiation-to-mass process will likewise result in gravity waves. The laser reactor can therefore be used as a gravity wave generator.

The lasing element itself need not be a single continuous entity, but can be constructed from a plurality of contiguous or interlocking sections, or other constructions, for the purpose of generating a substantially closed or closed convergent electromagnetic wave harboring different radiant frequencies, time-constants, or symmetries, such a composite wave being capable of, and intended to, complement the symmetries inherent in various reactant atomic, molecular, or nuclear structures.

What is claimed is:

1. A lasing reactor for producing and controlling a thermonuclear reactor process thermofusion endo-, equi-, exo-fusion or combinations thereof reactions said lasing reactor comprising:
    a. a closed or substantially closed hollow lasing element constructed so as to have focusing properties, said lasing element being in virtue of its lasing material properties and focusing properties a generator of closed or substantially closed respectively coherent electromagnetic waves convergent upon the inherent focal region or focal regions of said lasing element, the outer boundary of said lasing material being substantially reflective to said waves and the inner boundary of said lasing material being substantially emissive to said waves,
    b. the hollow portion of said lasing element being and defining a reaction chamber within which said reactions are produced by the convergent impingent closure of said waves upon reactants within said chamber,
    c. a speculum and outer shell surrounding said lasing element, said outer shell being a foundation for said lasing reactor and accoutrements, said speculum and outer shell having one or more sets of cooperating closeable orifices beneath which said closeable orifices the said lasing element outer boundary can be reflective where required to the lasing frequency of said lasing element and can be non-reflective to said lasing frequency where required, said closeable orifices being a means of regulation of influx and efflux of electromagnetic energy into and out of said chamber, said influx of electromagnetic energy into said chamber being a means of initially exciting said lasing element, subsequent to and as a result of which excitation influx said lasing element generates a closed or substantially closed respectively convergent coherent electromagnetic wave in conformity with said lasing element focusing and lasing properties, said efflux from said chamber being a means of obtaining for external use energy produced released within said chamber and also a means of regulation anc control of said thermofusion reactions, said speculum means being an accessory means of reflecting incident electromagnetic radiation from within said chamber,
    d. the combination of said lasing element, speculum and outer shell, having correspondingly penetrating holes said holes being used for introduction of reactants into and removal of byproduct reactants from, said chamber, said introduction of reactant being from a reactants source means and said removal of byproduct reactants being into a sink means, the cooperation of said source means with said sink means being also a means of regulation and control of said reactions,
    and enclosing within said closed or substantially closed hollow lasing element energy released from said reaction produced by said convergent impingence of said closed waves upon reactants within said reaction chamber, said released energy emitted divergently from said reaction impinging therefrom into said lasing element thus reexciting the lasing energy states of said lasing element, said released and emitted energy being feedback energy propagating from said reaction to said lasing element, said feedback energy thereby establishing cooperation between said reaction and said lasing element, said cooperation being a means for sustaining steady-state operation of said lasing reactor.

2. A lasing reactor for producing and controlling a thermodynamic reactor process endo-, equi-, exo-thermic or combinations thereof reactions said lasing reactor comprising
    a. a closed or substantially closed hollow lasing element constructed so as to have focusing properties, said lasing element being in virtue of its lasing material properties and focusing properties a generator of closed or substantially closed coherent electromagnetic waves convergent upon the inherent focal region or focal regions of said lasing element, the outer boundary of said lasing material being substantially reflective to said waves and the inner boundary of said lasing material being substantially emissive to said waves,
    b. the hollow portion of said lasing element being and defining a reaction chamber within which said reactions are produced by the convergent impingent closure of said waves upon reactant matters within said chamber,
    c. a speculum and outer shell surrounding said lasing element, said outer shell being a foundation for said lasing reactor and accoutrements, said speculum and outer shell having one or more sets of cooperating closeable orifices beneath which said closeable orifices the said lasing element outer boundary can be reflective where required to the lasing frequency of said lasing element and can be non-reflective to said lasing frequency where required, said closeable orifices being a means of regulation of influx and efflux of electromagnetic energy into and out of said chamber, said influx of electromagnetic energy into said chamber being a means of initially exciting said lasing element, subsequent to and as a result of which excitation influx said lasing element generates a closed or substantially closed convergent coherent electromagnetic wave in conformity with said lasing element focusing and lasing properties, said efflux from said chamber being a means of obtaining for external use energy produced and released within said chamber and also a means of regulation and control of said reactions, said speculum means being an accessory means of reflecting incident electromagnetic radiation from within said chamber, d. the combination of said lasing element, speculum and outer shell, having correspondingly penetrating holes said holes being used for introduction of reactants into and removal of byproduct reactants from, said chamber, said introduction of reactants being from a reactants source means and said removal of byproduct reactants being into a sink means, the cooperation of said source means with said sink means being also a means of regulation and control of said reactions, e. and enclosing within said closed or substantially closed hollow lasing element, energy released from said reaction produced by said convergent impingence of said closed waves upon reactants within said reaction chamber, said released energy being emitted divergently from said reaction impinging therefrom into said lasing element thus reexciting the lasing energy states of said lasing element, said released and emitted energy being feedback energy propagating from said reaction to said lasing element, said feedback energy thereby establishing cooperation between said reaction and said lasing element, said cooperation being a means for sustaining steady-state operation of said lasing reactor.

* * * * *